(12) United States Patent
Barillot et al.

(10) Patent No.: US 6,527,090 B1
(45) Date of Patent: Mar. 4, 2003

(54) GUIDING SPRING FOR FRICTION ELEMENTS AND DISC BRAKE COMPRISING SAME

(75) Inventors: Alain Barillot, Lagny (FR); Olivier Kubic, Orsay (FR); Christophe Chauveau, Angers (FR); Stéphane Bonnet, Drancy (FR)

(73) Assignee: Robert Bosch GmbH, Stuttgart (DE)

( * ) Notice: Subject to any disclaimer, the term of this patent is extended or adjusted under 35 U.S.C. 154(b) by 99 days.

(21) Appl. No.: 09/701,325

(22) PCT Filed: Oct. 20, 2000

(86) PCT No.: PCT/FR00/02938

§ 371 (c)(1),
(2), (4) Date: Nov. 27, 2000

(87) PCT Pub. No.: WO01/31223

PCT Pub. Date: May 3, 2001

(30) Foreign Application Priority Data

Oct. 26, 1999 (FR) .............................................. 99 14024

(51) Int. Cl.⁷ .............................................. F16D 65/40
(52) U.S. Cl. ................ 188/73.38; 188/73.1; 188/73.32
(58) Field of Search ............................ 188/73.1, 73.38, 188/73.32

(56) References Cited

U.S. PATENT DOCUMENTS

| | | | | | |
|---|---|---|---|---|---|
| 4,243,123 | A | * | 1/1981 | Watanabe | 188/73.38 |
| 5,577,577 | A | * | 11/1996 | Hirai et al. | 188/73.36 |
| 5,649,610 | A | * | 7/1997 | Shimazaki et al. | 188/73.36 |
| 5,687,817 | A | * | 11/1997 | Kobayashi et al. | 188/72.3 |
| 5,699,882 | A | * | 12/1997 | Ikegami et al. | 188/205 A |
| 5,901,815 | A | * | 5/1999 | Kobayashi et al. | 188/205 A |
| 5,941,348 | A | * | 8/1999 | Matsumoto et al. | 188/73.36 |
| 5,947,233 | A | * | 9/1999 | Kobayashi et al. | 188/1.11 W |
| 5,954,163 | A | * | 9/1999 | Suzuki et al. | 188/250 G |
| 6,003,642 | A | * | 12/1999 | Mori et al. | 188/73.37 |
| 6,186,288 | B1 | * | 2/2001 | Baba et al. | 188/73.36 |
| 6,223,866 | B1 | * | 5/2001 | Giacomazza | 188/73.36 |
| 6,234,284 | B1 | * | 5/2001 | Ashman et al. | 188/250 B |
| 6,286,636 | B1 | * | 9/2001 | Iwata | 188/73.31 |
| 6,293,373 | B1 | * | 9/2001 | Weiler et al. | 188/250 E |
| 6,296,085 | B1 | * | 10/2001 | Yukoku | 188/73.36 |
| 6,378,666 | B1 | * | 4/2002 | Yoko | 188/73.36 |

* cited by examiner

Primary Examiner—Jack Lavinder
Assistant Examiner—Benjamin A Pezzlo
(74) Attorney, Agent, or Firm—Leo H McCormick Jr.; Warren Comstock

(57) ABSTRACT

An axially guiding and radially retaining spring (3) for a friction element (15) of a disk brake. The spring (3) includes a throat section (5) mounted by being snap-locking onto a protrusion (7) of a support member (9).

3 Claims, 10 Drawing Sheets

GUIDING SPRING FOR FRICTION ELEMENTS AND DISC BRAKE COMPRISING SAME

The present invention relates to a guiding and retaining spring for friction elements, more particularly of the pad type, and also to a disk brake comprising at least one such spring.

BACKGROUND OF THE INVENTION

The use of yoke-mounted springs is well known as regards the axial translation guidance of disk brake pads. On the braking of a vehicle, fitted with such brakes, the pads, which are applied onto each rotating disk, are subjected to tangential forces directed towards an element of the support. The springs of the known type oppose a return force, which cannot be controlled as far as mass production is concerned, owing to the minimum allowable tolerances. Thus, a braking operation with a considerable deceleration gives rise to a force projecting the pads towards the support, such force being stronger than the return force exerted by the spring. The tangential impact of the pad on the support produces an unpleasant noise for the vehicle passengers, the so-called "klonk" which may, besides, be misinterpreted as the characteristic noise of a mechanical failure.

The present Applicant has found that the poor control of the tangential guidance of the pads resulted from the non efficient hooking of the springs onto the yoke. Moreover, a bow-shaped element usually connects two springs facing each other, the first one retaining the end of a first pad, capable of being applied onto a first main face of a disk, whereas the other one retains the corresponding end of the second pad, likely to be applied onto a second main face of the disk, opposite to said first main face. It is the reason why a specific spring must be available for each yoke width.

SUMMARY OF THE INVENTION

Therefore, it is an object of the present invention to provide a spring, which ensures an efficient axial guidance while it resists tangential impacts, whether direct or indirect (through the spring), of the guided friction element on the support, in particular on the yoke.

It is another object of this invention to provide such a spring, capable of exerting a high return force.

Another object of the present invention consists in providing a spring having but a small size.

Another object still of the invention relates to a spring having a long service life, including under severe operating conditions.

It is also an object of the present invention to provide a corrosion-resistant spring.

It is another object of the invention to provide such a spring, capable of being mounted on quite a number of various disk brakes, more particularly on disk brakes having yokes with various widths.

Another object of the present invention concerns a disk brake comprising at least one, and preferably four, such spring(s).

It is an object of this invention to provide an outstandingly reliable disk brake.

Another object still of the present invention consists in providing a disk brake at a moderate cost price.

And another object of this invention is to provide a particularly silent disk brake.

These objects are achieved by a spring according to the invention, which comprises assembly means capable of cooperating with complementary assembly means borne by a support, typically by the yoke of a disk brake. The engagement of the assembly means of the spring with those of the support ensures both their interlocking and the keeping of the spring in position on the support. Advantageously, the spring is attached by one end to the support, its other end being free and having, preferably, a wide range of movement in the free state, prior to the mounting of the friction element.

This invention essentially concerns an axially-guiding and radially-retaining spring for the friction elements of a disk brake, comprising assembly means capable of cooperating with complementary assembly means borne by a support, characterised in that the cooperation of said assembly means ensures their interlocking.

In accordance with a feature of this invention, such a spring is characterised in that the assembly means, borne by the spring, include a male element, capable of cooperating with a female means by engaging with said female means on a snap-locking operation.

Another aspect of the present invention lies in such a spring, characterised in that said spring is a leaf spring, consisting of a stamped-out and folded sheet, and in that the male element is a lug.

According to another feature, said spring has approximately the shape of the number "5", in a side view.

The present invention also deals with a disk brake, characterised in that it comprises at least one spring according to the invention.

Another subject of this invention is such a disk brake, characterised in that it comprises two friction element-forming pads, each pad having two radially-opposite ears and each ear being guided by a spring according to the invention.

Another subject matter still of the present invention is such a disk brake, characterised in that the spring support consists of a yoke having a first arm arranged opposite a first main face of a disk, and a second arm located opposite a second main face of the disk in the opposite direction to said first disk face, both arms being connected by at least one bow-shaped element.

According to another aspect of the invention, such a disk brake is characterised in that the spring is tied down to the support by one end only, its other end being free.

In a further aspect of the present invention, such disk brake is characterised in that, at rest, the free end of the spring is located at a distance from the support.

The invention also deals with such a disk brake, characterised in that the friction elements are square-eared pads and in that each spring defines a throat for the axial guidance of a square-eared brake pad.

Other features and advantages of the present invention will be apparent from the following detailed description, by way of example and by no means as a limitation, when taken in conjunction with the accompanying drawings.

DETAILED DESCRIPTION OF THE INVENTION

Figure 2:
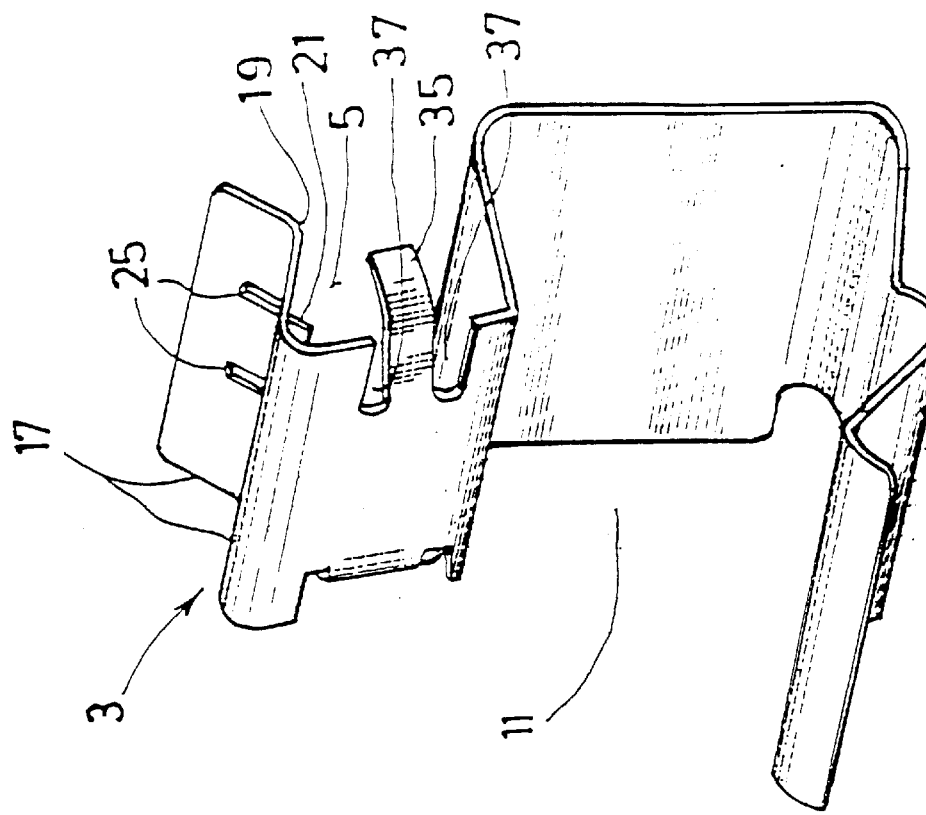
FIG. 2 is a perspective view of the spring of FIG. 1, after a 90° rotation.
Figure 1:
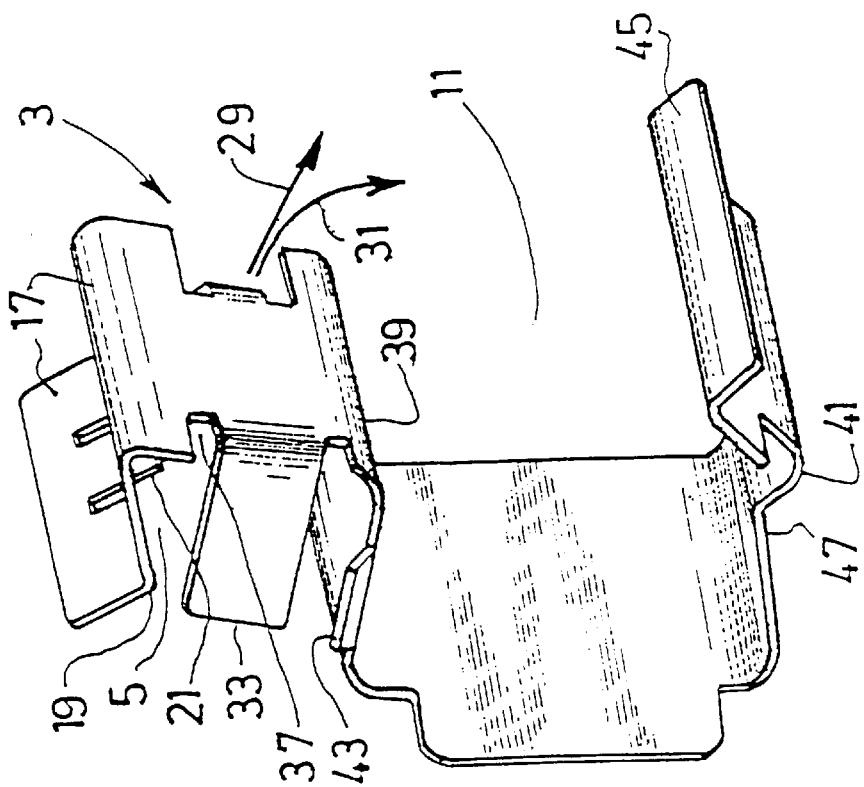
FIG. 1 is a perspective view of the preferred embodiment of a spring according to this invention.
Figure 3:
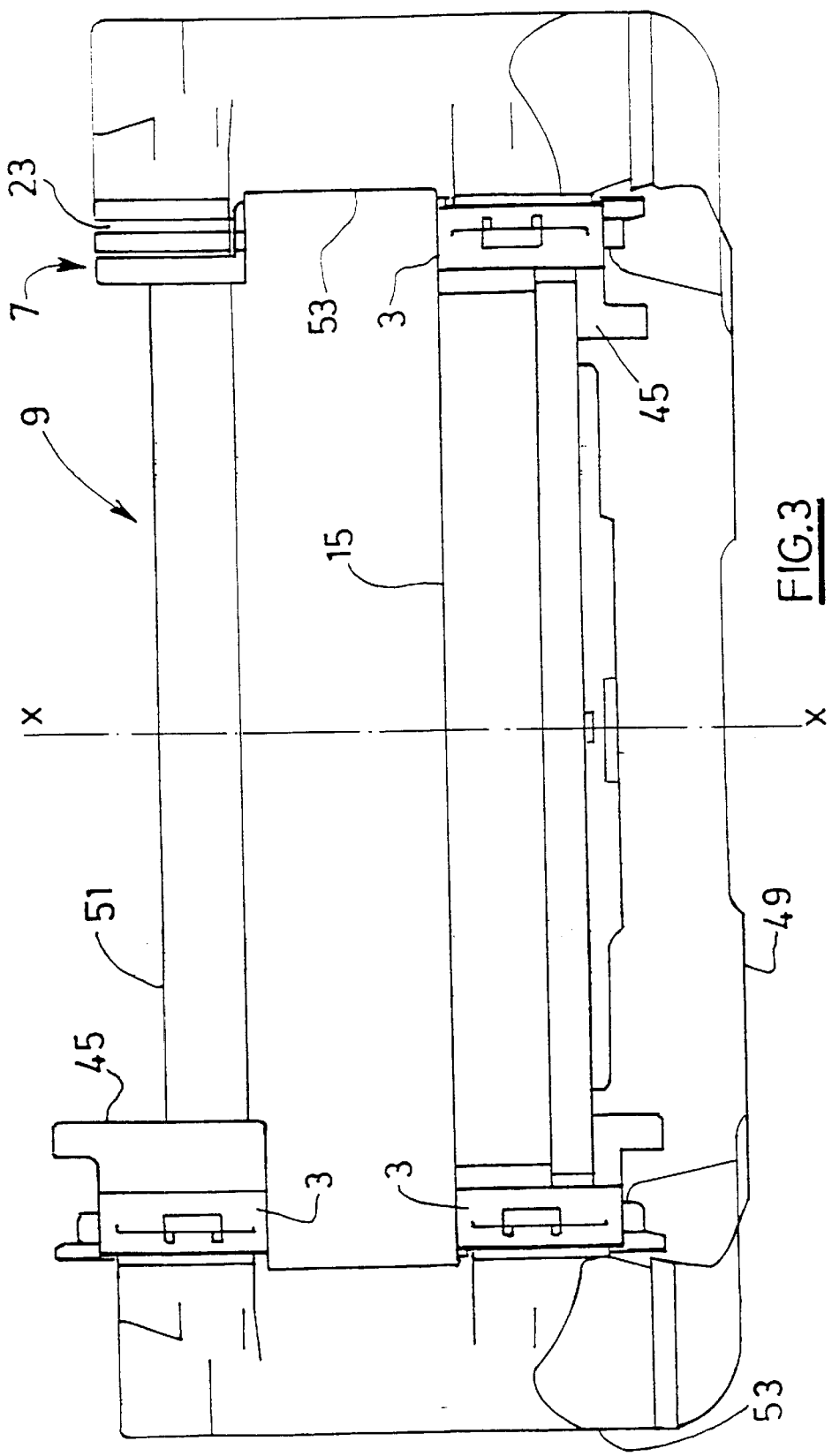
FIG. 3 is a top view showing a yoke of a disk brake according to this invention, the lower part of which, in the figure, is fitted with a brake pad whereas, in the upper part of the figure, the pad and the upper right-hand spring are not represented.
Figure 4:
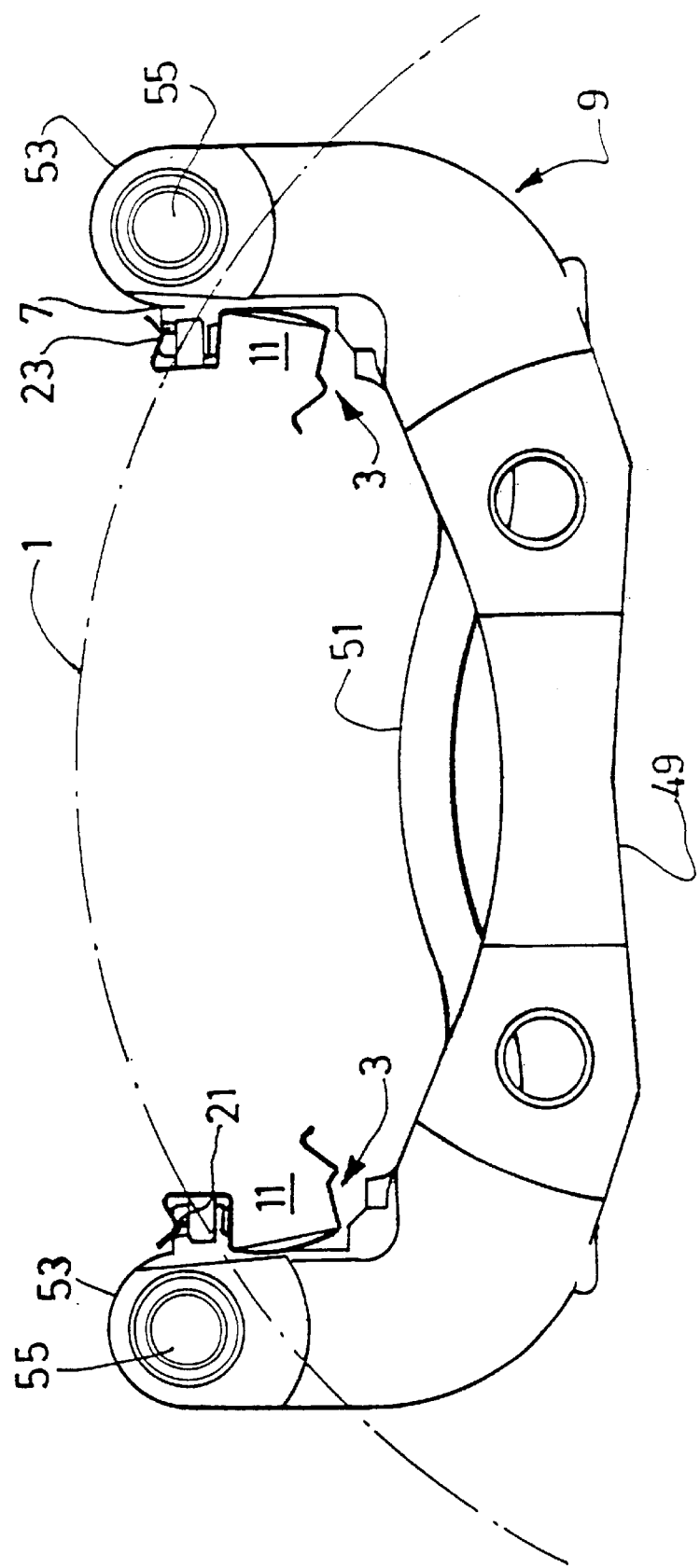
FIG. 4 is a side view of the yoke of FIG. 3, prior to the mounting of brake pads.
Figure 5:
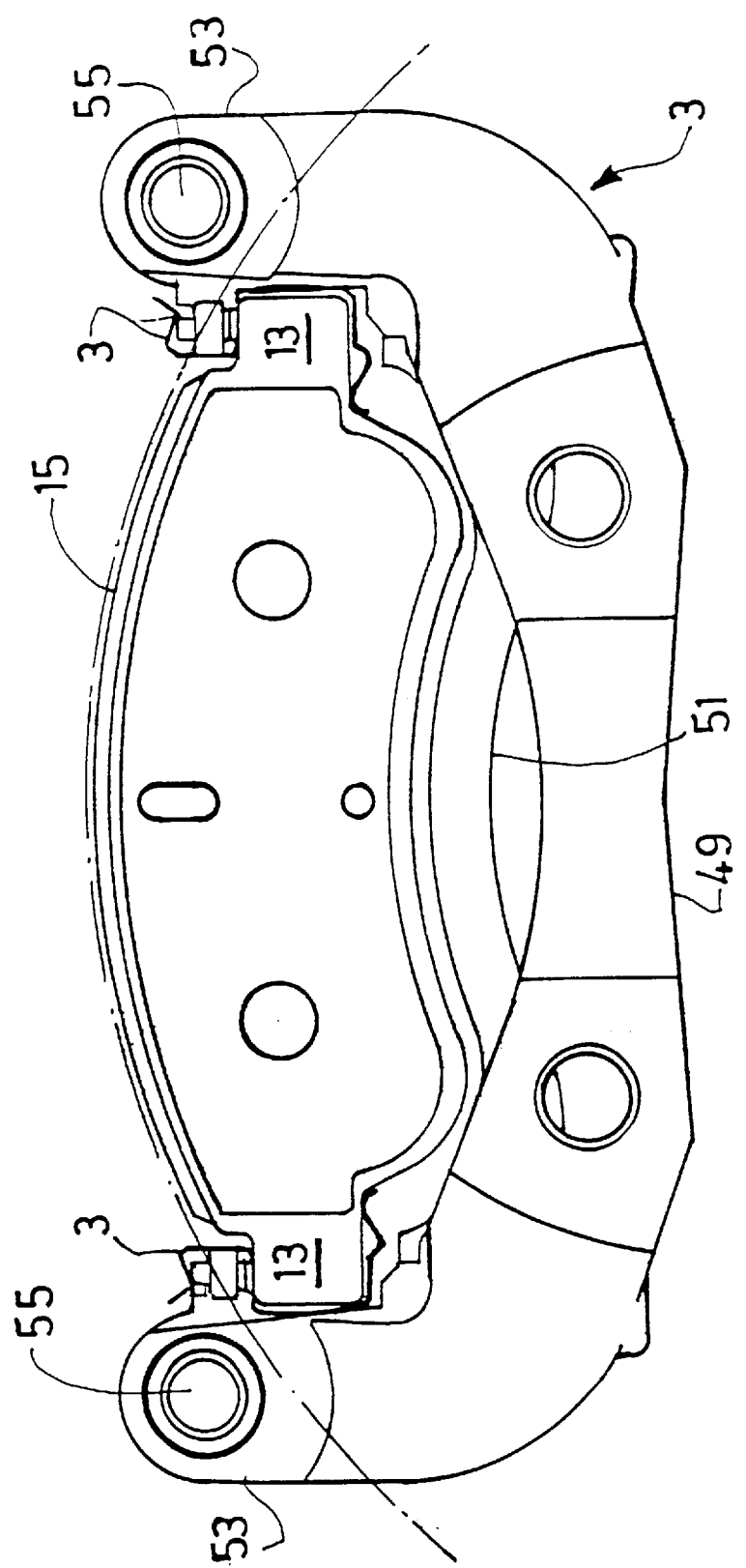
FIG. 5 is a similar view, once the pads have been mounted.

In FIGS. 1 through 11, the same reference numerals will designate the same elements. In the following description, the expression "axial force" will refer to a force exerted in a parallel direction to the X axis (FIG. 3) corresponding to the axis of a disk 1 (shown in a phantom view in FIGS. 4 and 5), whereas a tangential force will mean a force exerted coaxially with the disk 1, and a radial force will indicate a force applied along a radius of the disk 1.

FIGS. 1 through 9 show the preferred embodiment of a spring 3 according to this invention, which, in a side view, looks somewhat like the number "5", thus defining a first throat 5 for the mounting onto an element 7 of a support 9, typically to a protruding part 7 of a yoke 9, and a second throat 11 accommodating an ear 13 of a friction element 15, typically a brake pad.

The shape of the first throat 5 is adapted to that of the protruding part 7 on which it rests. In the advantageous example as represented, the protruding part 7 of the yoke 9 substantially forms a right-angled parallelepiped with a square base and the height of which extends axially. In this advantageous example, the throat 5 is substantially U-shaped. Judiciously, one of the U sides 17 and, preferably, the side facing away from the second throat 11, comprises an axial edge 19 applying a considerable force on the protruding part 7.

The secure fastening of the spring onto the support 9 actually is an essential feature of the present invention. This feature may be further improved in an advantageous manner if the spring 3 is locked to the support 9 and preferably to the protruding part 7. This locking is carried out by the engagement, in the locked state, of a male element of one of the elements to be assembled, with a recess or a receiving cavity situated in the other element. In this non-limitative advantageous example as illustrated, the male element is a lug 21 borne by the side 17 of the throat 5 of the spring 3, the female element being an axial groove 23, made in the protruding part 7 and facing the lug 21 (upper face in FIGS. 4 through 9).

Advantageously, the lug 21 is cut in the face 17. It may be judicious to give the lug 21 some elasticity, for instance by providing two slots 25 entending from the edges of this lug.

Though the implementation of a lug 21 arranged along the median plane 27 of the groove 23 does not depart from the scope of the present invention, it may be advantageous to provide an α angle between the lug 21 and the plane 27, so as to efficiently resist a tensile force, applied in the direction of the arrow 29, and a tilting moment as well, as represented by the arrow 31. The α angle is preferably in the range from 3° to 87° and, preferably still, in the range from 10° to 60° and quite preferably in the range from 25° to 50°. In the advantageous example as shown, the α angle is equal to 45°. In the preferred example, the lug 21 has the same slope as the end part of the spring side 17 and it extends beyond the edge 19 so as to enter the groove 23 of the protruding part 7.

Moreover, the inclination of the lug 21 makes it possible to attach the spring 3 according to this invention quickly to the protruding part 7 of the support 9, with a snap-locking action when the throat 5 of the spring 3 is driven onto the protruding part 7 and when this lug 21 enters the groove 23.

In the illustrated example, the groove 23 extends over the whole axial length of the protruding part 7 and thus the machining of the groove 23 is made easier. Yet, the use of a recess or a receiving groove or cavity 23 for the lug 21, covering part of the axial length of the protruding parts 7, does not depart from the scope of this invention. The machining of such cavities is a more expensive process but they do resist more efficiently an axial displacement of the spring 3 on its support 7.

The spring 3 may be fitted with other means preventing its axial displacement. In the represented example, the spring 3 comprises a first lug 33 and a second lug 35, which lie at right angles to the sides and the root if the U-shaped throat and are intended to prop against the axially-opposite faces of the protruding parts 7. In an advantageous manner, the lug 33, which is designed to provide resistance to a displacement of the spring 3 on braking (typically, use of an hydraulic device to apply the friction elements 15 on the disk 1), is wider than the lug 35, aiming at opposing a displacement of the spring 3 on the protruding part 7 when the brake is released (i.e. when the friction elements 15 are moving apart from the disk 1). Notches 37 may be provided along the roots of the lugs 33 and 35 to improve their compliance. It is to be understood that the use of other means for the fastening of the spring 3 on the support 9, for instance the use of a rivet or of a bolt extending through an opening made in the spring, does not depart from the scope of this invention. As will be fully explained hereafter in reference to FIGS. 6 through 11, in an advantageous manner, the spring 3 according to this invention can be fastened by only one of its ends, the other end remaining free. However, the use of a spring fastened by both ends to the support 9 does not depart from the scope of the present invention.

A brake in accordance with this invention advantageously includes four springs 3 according to the invention, that is one at each tangential end of each friction element. In a judicious manner, the brake comprises four independent identical springs. Thus, the same type of spring may be fitted in brakes having different axial widths. Nevertheless, the implementation of springs facing each other, on either side of the disk 1 and connected by a bow-shaped element does not depart from the scope of the present invention.

The shape of the throat 11 matches that of the friction element ears. Thus, a throat 11 having a semicircular or a substantially semicircular section should be used for the guidance of round-tipped pads. The illustrated advantageous example shows a U-shaped throat accommodating the ears of a "square-tipped" pad. The radial distance between the opposite sides 39 and 41 of the U-shaped throat 11 is substantially equal to the radial extent of the pad tips or ears. The side 39 of the throat 11 corresponds to that side of the throat 5, opposite to the side 17. Advantageously, the throat 11 comprises a first guiding lug 43 for the axial insertion of the tip of the pad 15 in the throat 11, and a second guiding lug 45 for the tangential insertion of the tip of the pad 15 in the throat 11. In an advantageous manner, the free end 41 of the throat 11 is provided with a rib 47 for an improved torsional strength. Thus, the guiding rigidity is not affected by a possible wear of the pads 15 with an alteration of the axial position, at rest, of the pad 15 tip within the throat 11 of the spring 3.

Advantageously, the corners of the spring 3 are rounded so as not to be sharp and therefore to prevent a mechanic from being injured in the course of a maintenance operation.

The spring 3 according to this invention consists of a stamped-out and folded stainless steel sheet, preferably having a thickness smaller that 1 mm, e.g. equal to 0.4±0.03 mm. Stainless steel, for instance grades Z10CN 18.08, Z12CN 17.07, or steel of the SAE 30301 or 30302 type may be used.

In the preferred example of a brake according to the present invention, a yoke 9 comprises two arms 49 and 51, arranged on either side of the disk 1 and connected, at each one of their ends, by a bow-shaped element 53 extending in the axial direction and radially located beyond the disk 1. The bow-shaped elements 53 have receiving openings 55 for the guide elements of a caliper (non shown) supporting applying means, typically under hydraulic control, for the friction elements 15 to the opposite main faces of the disk 1. However, the use of other supports 9 or other applying means for the friction elements 15 does not depart from the scope of this invention.

Figure 9:
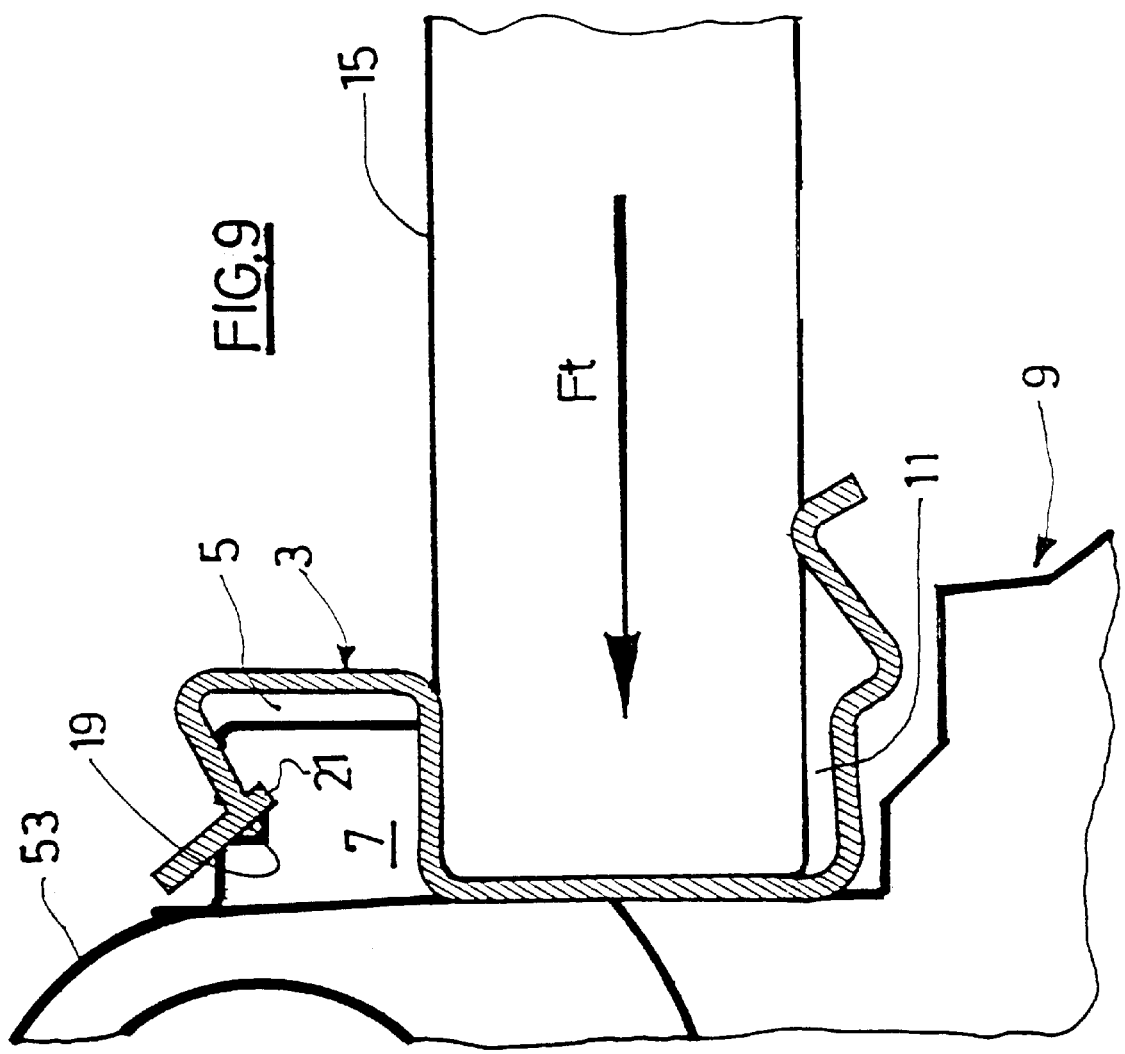
FIG. 9 is a similar view in the course of a quite strong braking operation.
Figure 10:
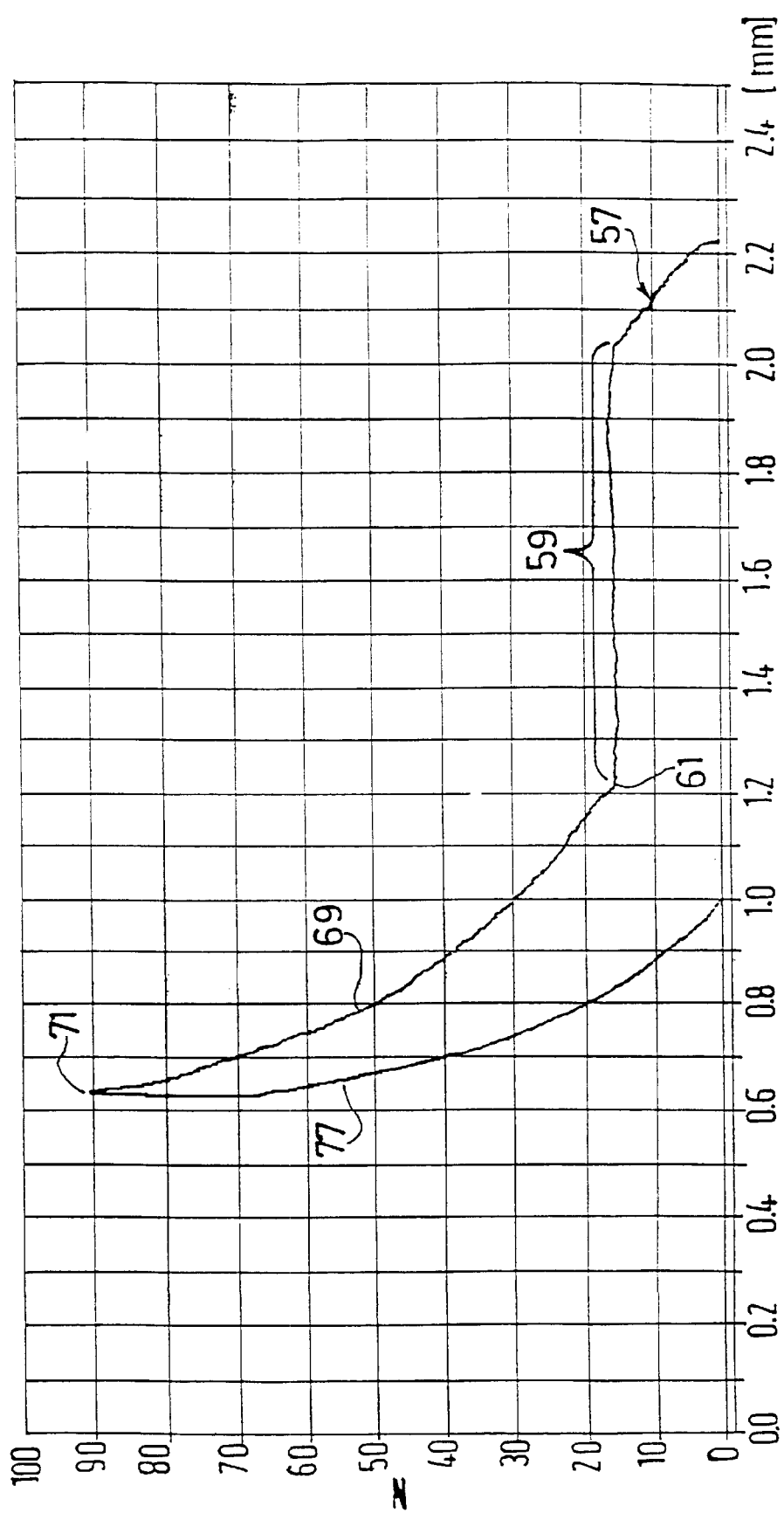
FIG. 10 is a curve showing the position and, hence, the distortion of the spring according to the preferred embodiment of the present invention, as a function of the exerted return force.

FIG. 10 shows a curve 57 with an hysteresis, illustrating the behaviour of the spring 3 according to the present invention, when subjected to low tangential forces (Ft in FIGS. 6 through 9). The spring position, plotted on the X-axis, is expressed in mm whereas the stress exerted on the spring is plotted on the Y-axis and expressed in N.

The friction elements 15 are but partly shown in the explanatory drawings 6 through 9.

Figure 6:
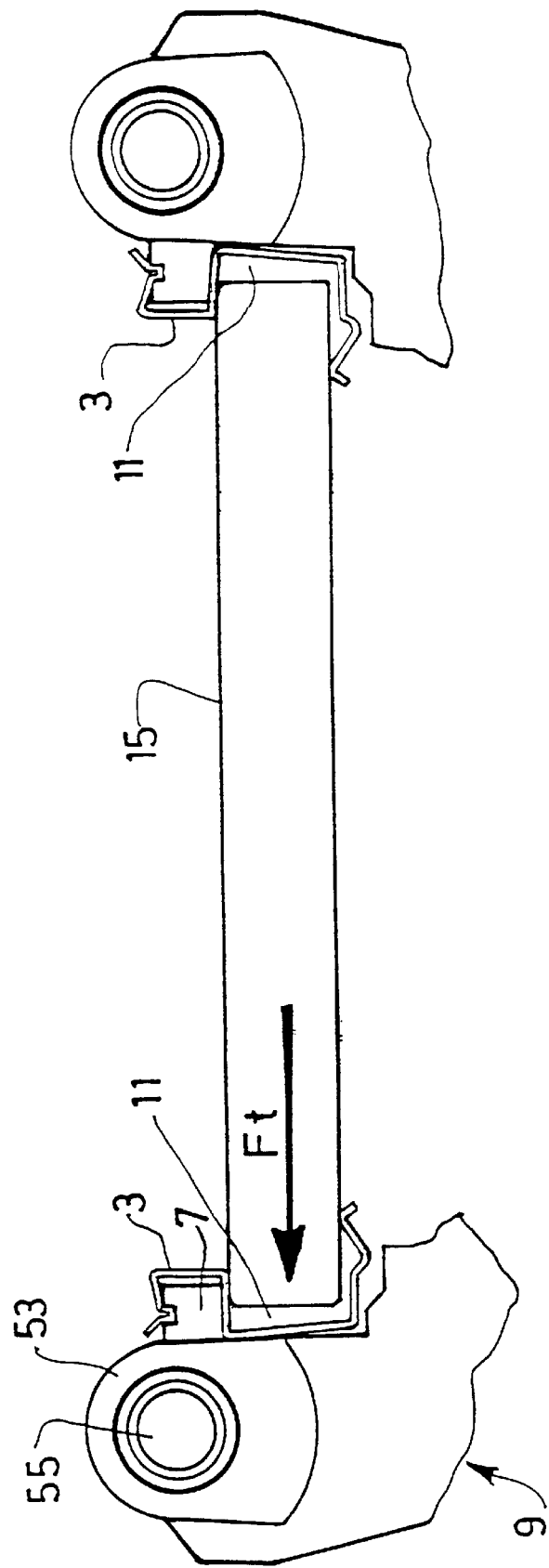
FIG. 6 is a schematic partial side view of the yoke of FIG. 3, fitted with a pad applying a force corresponding to that obtained on the mounting of an actual pad.
Figure 7:
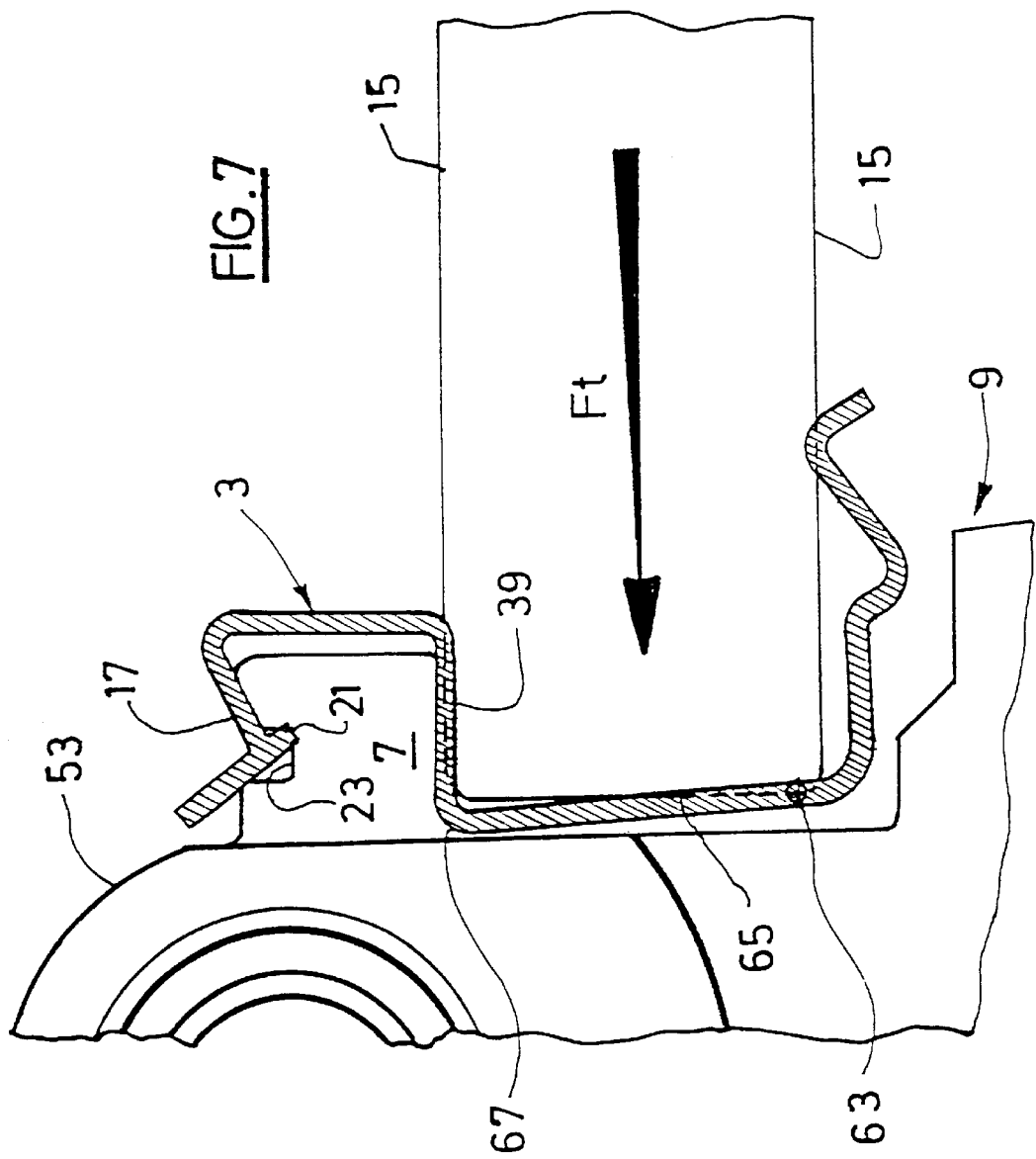
FIG. 7 is a schematic partial view, showing the forces applied by a pad in the mounted state and at rest, i.e. the pad is not driven by the disk.
Figure 8:
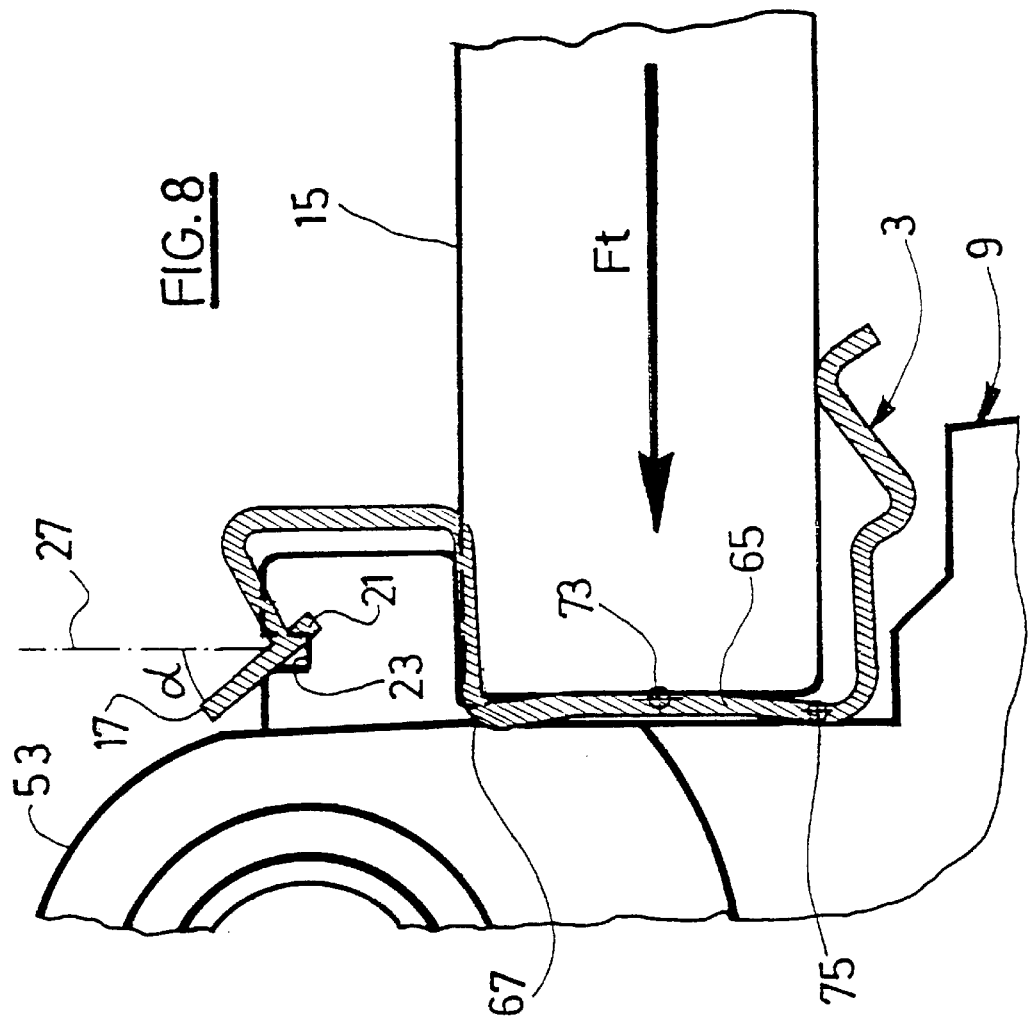
FIG. 8 is a similar view, during a braking operation.

In FIG. 6, the friction element 15 is pinched between the sides 39 and 41 of 11 the throat 11 of the spring 3. It corresponds to the substantially horizontal area 59 of curve 57 for a stress in the order of 17 N, with a displacement between 2 mm and 1.2 mm. The point 61 of the curve corresponds to a point of contact 63 (FIG. 7) between the friction element 15 and the root 65 of the U-shaped throat 11. It should be noted that the point of contact 63 is located near the intersection of the root 65 with the side 41 of the throat 11 of the spring 3. The point 67 corresponds to the intersection of the root 65 with the side 39, bearing on the yoke. In the area 69, corresponding to a displacement ranging between 1.2 mm and 0.620 mm, the point of contact 63 moves in the direction of the point 67, which it reaches at point 71, corresponding to the state illustrated in FIG. 8. Here, the root 65 of the throat 11 of the spring 3 shows a concavity directed towards the friction element 15, with which it has a point of contact 73, in a sectional view. The root 65 bears on the yoke 9 at points 67 and 75. This configuration efficiently prevents the friction element 15 from touching the yoke 9, such contact resulting in an unpleasant noise, the so-called "klonk". The return on the brake-releasing operation is represented at 77. The squashing of the root 65 of the throat 11 of the spring 3, under an increasing tangential force up to the establishment of a plane contact, which corresponds to the point 81, with a force exceeding 51 daN, as shown in FIG. 9, is indicated by the curve 79 of FIG. 11, a curve for which the ordinate scale has been widened and expressed in daN.

Figure 11:
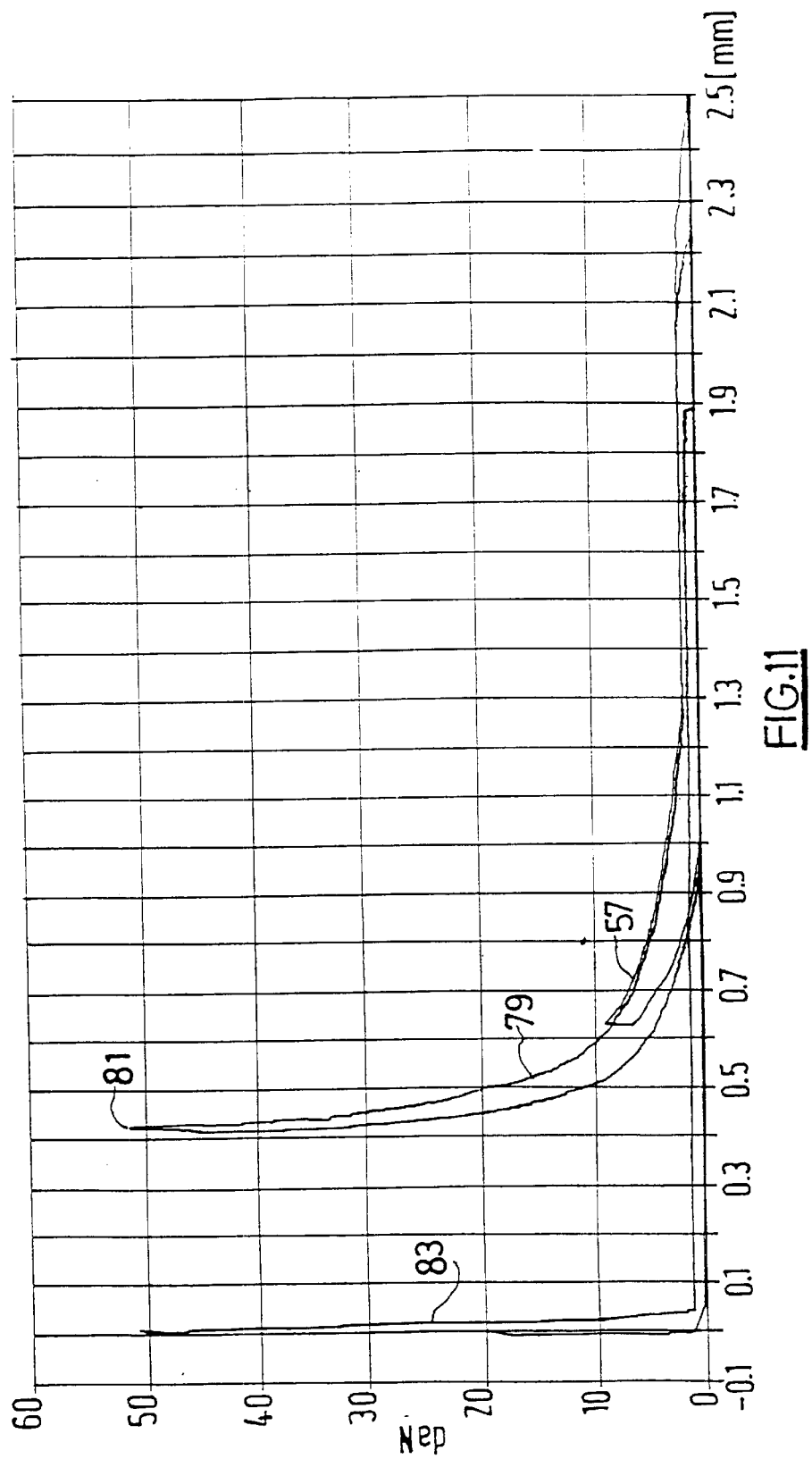
FIG. 11 shows two similar curves with an extended force scale.

On the left-hand side of FIG. 11, the curve 83 shows the stiffness of the measuring bench, which stiffness has been taken into account for the measurements expressed by the curves 57 and 79.

Considering the forces involved, the state represented in FIG. 9, corresponding to the so-called "klonk", is quite exceptional, it never happens in the usual practice and it corresponds merely to an utmost emergency braking situation. Besides, it results in a further advantage. In normal use, the spring 3 has a very small contact area with the yoke, which typically consists of cast iron having undergone an anticorrosion treatment, for instance using zinc alloys. As is well known, such contact contributes to the spring corrosion. And therefore, thanks to its design, the spring 3 according to the present invention exhibits a better corrosion resistance than the spring of the known type. But yet it still holds true that the anticorrosion surface treatment of the spring 3 according to this invention does not depart from the scope of the invention.

The present invention concerns, more particularly, the motor car industry.

And the present invention mainly applies to the design and manufacturing of motor vehicle brakes.

We claim:

1. A disk brake including a first axially-guiding and radially-retaining spring and a second axially-guiding and radially-retaining spring for positioning a corresponding first friction pad and a second friction pad with respect to a disk, said first and second friction pads each being defined by first and second radially-opposite ears with each ear being guided by said first and second axially-guiding and radially-retaining springs retained in a support, said support for said first and second said axially-guiding and radially-retaining springs consisting of a yoke having a first arm arranged opposite a first main face of said disk and a second arm located opposite a second main face of said disk in the opposite direction to said first main face, said first and second arms being connected by at least one bow-shaped element characterized in that said first arm has a first protruding part and a second part extending therefrom and said second arm has a first protruding part and a second part extending therefrom, each protruding part forming a right-angled parallelepiped with a square base with an axial groove on a top surface thereof that is parallel to the axis of said disk, and in that said first and second axially-guiding and radially-retaining springs each having a shape that in a side view looks like the number "5" to define a first throat that rests on said first protuding part and a second throat that receives one of said first or second ears of said first and second friction pads, each of said first throats having a having an axial edge located in said axial groove of said first protruding part that bears on said top surface with considerable force to retain said first and second axially-guiding and radially-retaining springs on said protruding part, said axial edge being further defined by a first lug that extends into said axial groove to lock said first and second axially-guiding and radially-retaining springs onto said first protruding part such that a second lug on said second throat is free to move and provide a resilient force to hold said first and second ears against a common wall of said first and second throats.

2. The disk brake according to claim 1, characterised in that said first and second ears on said first and second friction pads are square and in that each second throat defines axial guidance for said first and second ears pads.

3. The disk brake according to claim 2 characterized in that said first lug has an angle of approximately 45 degrees to define said lock to retain said first and second axially-guiding and radially-retaining springs onto said proturding part.

* * * * *